UNITED STATES PATENT OFFICE.

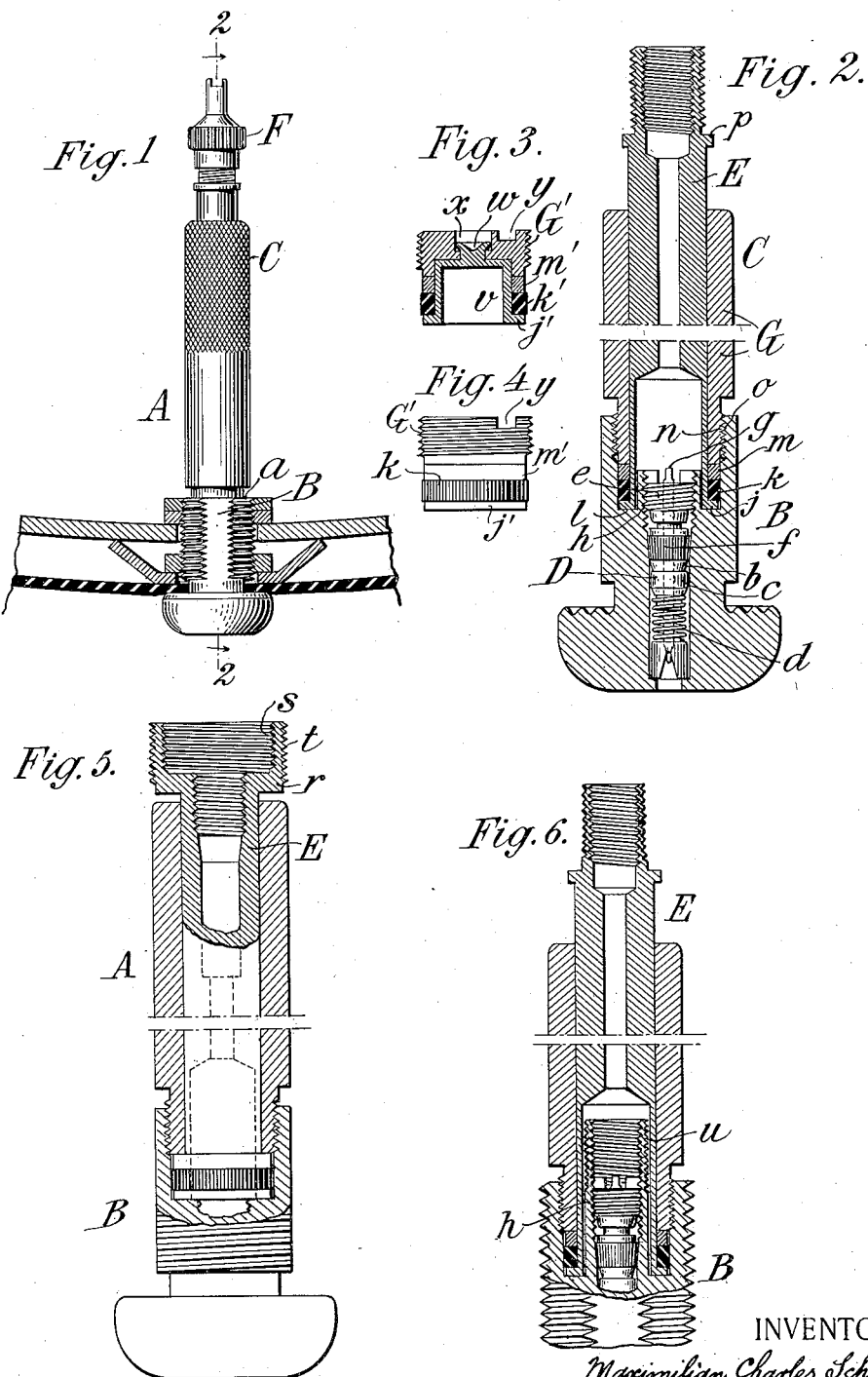

MAXIMILIAN CHARLES SCHWEINERT, OF WEST HOBOKEN, NEW JERSEY, AND HENRY P. KRAFT, OF BROOKLYN, NEW YORK.

TIRE-VALVE.

1,211,769.  Specification of Letters Patent.  Patented Jan. 9, 1917.

Application filed March 14, 1910. Serial No. 549,242.

*To all whom it may concern:*

Be it known that we, MAXIMILIAN CHARLES SCHWEINERT, residing in West Hoboken, in the county of Hudson and State of New Jersey, and HENRY P. KRAFT, residing in the borough of Brooklyn, county of Kings, city and State of New York, both citizens of the United States, have invented certain new and useful Improvements in Tire-Valves, of which the following is a specification.

The invention relates to tire valves and aims to provide certain improvements therein.

The present invention in its preferred form is especially adapted for use in connection with so-called demountable rims, that is to say, rims which are detachably connected to the wheel and which are designed to carry the fully inflated tire, the rim and tire being held in reserve, and substituted in case of accident for a similar tire and rim upon the wheel. In this type of rim and tire it is desirable that the valve shall extend materially inward from the inner face of the rim, so that it may be easily applied to the wheel rim without weakening the latter.

The invention in its preferred form provides a valve shell in two parts, the first of which is provided with the valve proper or check, and the second of which is designed to be detachably connected to the first, and to extend inwardly through the wheel rim so that the tire may be inflated or deflated without removing the demountable rim from the wheel. Preferably also the part carrying the valve proper is provided with a pump connection by which the tire may be deflated when demounted without the necessity of coupling the second part to the first. The invention includes other improvements which will be hereinafter more fully pointed out.

In the drawings which illustrate several forms of the invention, Figure 1 is an elevation of one form. Fig. 2 is an enlarged longitudinal section of Fig. 1. Fig. 3 is a section of the auxiliary cap. Fig. 4 is an elevation thereof. Fig. 5 is an enlarged longitudinal section showing one embodiment of the invention in its complete form. Fig. 6 is a section similar to Fig. 5 showing another such embodiment.

Referring to the drawings, let A indicate the valve as a whole which is shown as comprising two parts, B and C. The lower part B is adapted to be screwed to or otherwise engaged with the inner tube of the tire, for this purpose being provided with a suitable exterior screw $a$ adapted to receive the usual clamping nuts as shown. Within the part B is located a valve proper D which may be of any suitable construction, that illustrated being of the well-known Schrader type. This valve requires no detailed description further than to say that it comprises a valve seat $b$, a valve member $c$ engaging the lower face thereof, and the valve member being normally pressed upwardly by a spring $d$. The valve seat $b$ is held in position by a screw-threaded plug $e$ which presses the seat downwardly against an inclined shoulder in the shell so that its packing $f$ makes a tight joint between the seat and the shoulder. The parts are held together by a deflating pin $g$.

The shell B is provided at its upper end with an enlarged socket or recess adapted to receive the lower end of the member C in a manner to be described, and into such recess there extends upwardly a nipple $h$ which is preferably formed integrally with the body of the member B and which is shown as internally screw-threaded to engage the plug $e$. The upper end of the shell B is also screw-threaded.

The member C is shown as comprising a part E, the outer end of which is screw-threaded externally to receive the usual cap F and internally to receive the ordinary pump connection. It is important that an air-tight joint be provided between the lower end of the part E and the member B so that during the act of inflation through the member E there will be no leakage of air around the joint and also for the purpose of utilizing the cap F to prevent escape of air from the tire in case there is a leakage through the valve proper. The preferred construction is illustrated in the drawings. In this construction the lower end of the part E is adapted to enter the upper recess in the shell B and is provided with a flange $j$ seating against a shoulder $l$ at the bottom of said recess. Above the flange $j$ is located a packing ring $k$, and above this packing ring is preferably located a metal washer $m$ which is designed to be pressed downwardly to expand the packing against the walls of the shell B. The invention provides a means for expanding this packing which may be operated from a point near the upper end of the part E, which means is shown as comprising an elongated sleeve G encircling the body of the part E and being adapted to slide thereon. The sleeve G is formed at its lower end with a screw-threaded portion $n$ designed to engage the interior thread $o$ formed on the interior of the part B. When the threads are engaged and the sleeve G is screwed downwardly, it presses upon the washer $m$, which in turn compresses the packing $k$ and forces it outwardly into engagement with the wall of the part B. In order to prevent the removal of the sleeve G, a flange $p$ is preferably formed upon the upper part of the member E as shown.

As thus far described the invention is of practical utility especially for use in connection with demountable tires. In practice the lower part B is connected to the inner tube of the tire and projects slightly through the usual valve hole in the demountable rim. In use the fully inflated tire is carried upon the rim until it is desired to replace one of the tires of the vehicle. The used tire and rim having first been removed from the wheel, the reserve tire and rim are slipped over the wheel rim and fastened by any one of the usual methods. The part C is then inserted through the valve hole in the wooden rim and screwed into place in the member B. This may be done easily from the inner side of the wooden rim because of the provision of the elongated sleeve G. If the part E were to be directly screwed to the part B, there would be considerable danger of distorting the packing which is relied upon to make a tight joint between the parts. By the present construction not only is the packing expanded without any torsional effect, but the part E by means of its flange $j$ is seated firmly and securely at the bottom of the recess of the part B, and a strong mechanical union is provided so that the ordinary shocks or jars to which the valve is subjected will not disturb the joint. If the air pressure within the tire should decrease while the tire is in use, the valve cap F may be removed and the tire inflated without removing the rim from the wheel.

In inflating the tire when the latter is not mounted upon the wheel, the part C may be screwed into place and the tire inflated in the usual way, whereupon the part C may be removed if desired, or it may be retained in place until it is desired to use the tire. It will then be removed until the rim and tire are placed upon the wheel and afterward restored to its position. It is preferred, however, to utilize a further feature of the invention which consists in providing the member B with a pump connection so that the tire may be inflated when dismounted without the necessity of utilizing the part C. In Figs. 2 and 5 the part B is provided with internal screw threads adapted to receive such a pump connection. It is very desirable to have the same sized connection both for the part B and the part E. In Fig. 5 the part E is shown with an enlarged upper end $r$ provided with an internal screw thread $s$ designed to receive the pump connection and an external thread $t$ designed to receive the cap, which latter in this case will be correspondingly proportioned. The internal diameter and thread of the enlarged portion $r$ corresponds to the internal diameter and thread of the recess of the part B so that the same pump connection can be used in both places. It is preferred, however, to utilize a pump connection of the usual size, and in Fig. 6 a construction is shown by which this result is secured. In this construction the nipple $h$ is continued upwardly beyond the point shown in Fig. 2, and its exterior is screw-threaded at $u$ to receive the same size pump connection as fits the upper end of the part E. With this construction the part C need not be applied to the part B except when the tire is actually in place upon the wheel. The invention includes the provision of such a cap which in its preferred form is illustrated in Figs. 3 and 4. As shown in these figures the cap consists of a body $v$ having a flange $j'$ at its lower end and a packing $k'$ immediately above said flange. Above the packing is located a metal ring $m'$ which is designed to be pressed down by a screw-threaded sleeve member G' to expand the packing $k'$ into contact with the wall of the shell B. The sleeve member G' is swiveled to the body $v$ as shown by means of a central projection $w$ formed on the body $v$ which extends through a hole $x$ in the sleeve member G'. The hole $x$ is formed with an enlarged upper end and the projection $w$ is upset therein to hold the parts together. A screw driver slot $y$ is preferably provided in the sleeve member G' so that it may be tightened in place. The cap is screwed down in the upper recess of the member B, the screw-threaded sleeve member G' engaging the screw threads of the recess.

It will be understood that while several forms of the device have been shown and described, the invention is not limited to the particular embodiments set forth, as various changes may be made therein without departing from the invention. It will also be understood that while the invention has been described in its complete form, the several features thereof may be independently utilized if desired.

What I claim is: —

1. In a tire valve, a valve shell formed in two parts, the lower part being provided with a socket at its top, and the upper part being adapted to fit in said socket, said lower part being formed with a threaded portion, and a sleeve encircling the upper part and having a threaded portion adapted to engage the threads of said lower part.

2. In a tire valve, a valve shell formed in two parts, the lower part being provided with a socket at its top, and the upper part being adapted to fit in said socket, a packing ring surrounding said upper part within said socket, an anti-friction ring above and in contact with said packing ring, and a screw-threaded sleeve adapted to engage screw threads on said lower part and to press said anti-friction ring inwardly whereby to expand said packing against the wall of said lower part.

3. In a tire valve, a valve shell formed in two parts, the lower of said parts having a valve proper therein, and the upper of said parts being adapted to fit into said lower part, and both of said parts having provisions of the same size for engaging a pump connection.

4. In a tire valve, a valve shell formed in two parts, the lower of said parts having a valve proper therein, and the upper of said parts being adapted to fit into said lower part, and both of said parts having screw-threaded portions adapted to fit a single pump connection.

5. In a tire valve or the like, the combination of a lower member adapted to be attached to a tire and having a valve proper therein, and a second member adapted to be connected to said first member, said second member having a lower flange, a packing ring surrounding said member above said flange, an anti-friction ring above said packing, and a screw-threaded part adapted to engage screw threads on said lower member to force said packing against the wall of said lower member.

6. In a tire valve, a valve shell formed in two parts, the lower of said parts having a valve proper therein, and the upper of said parts being adapted to fit into said lower part, said lower part having an annular screw-threaded channel on its upper end between the inner and outer walls thereof adapted to receive said upper part.

7. In a tire valve, a valve shell formed in two parts, the lower of said parts having a valve proper therein, and the upper of said parts being adapted to fit into said lower part, said lower part having an annular channel on its upper end between the inner and outer walls thereof adapted to receive said upper part.

8. In a tire valve, a valve shell formed in two parts, the lower of said parts having a valve proper therein, and the upper of said parts being adapted to fit into said lower part, said lower part having an annular screw-threaded channel on its upper end between the inner and outer walls thereof adapted to receive said upper part and the central portion of said lower part projecting beyond the outer portion thereof.

9. In a tire valve, a valve shell formed in two parts, the lower of said parts having a valve proper therein, and the upper part being adapted to fit into said lower part, said lower part having an annular screw-threaded channel on its upper end adapted to receive said upper part and the central portion of said lower part and being provided with external and internal screw-threads projecting beyond the outer portion thereof.

10. In a tire valve, a valve shell formed in two parts, the lower of said parts having a valve proper therein, and the upper parts being adapted to fit into said lower part, said lower part having an annular screw-threaded channel on its upper end adapted to receive said upper part and the central portion of said lower part projecting beyond the outer portion thereof and being provided with external and internal screw-threads.

11. In a tire valve or the like, the combination of a lower member, adapted to be attached to a tire, having a valve proper and a socket therein, and a second member adapted to be connected to said first member, said second member having a lower flange adapted to seat firmly against the bottom of the socket in said first member, a packing ring surrounding said second member above said flange, an anti-friction ring above said packing, and a screw threaded sleeve adapted to engage threads on said lower member to force said packing laterally against the wall of the socket in said lower member.

In witness whereof we have hereunto signed our names in the presence of two subscribing witnesses.

MAXIMILIAN CHARLES SCHWEINERT.
HENRY P. KRAFT.

Witnesses:
EUGENE V. MYERS,
FRED WHITE.